United States Patent [19]

Obermeier

[11] Patent Number: 4,591,350
[45] Date of Patent: May 27, 1986

[54] COMPENSATOR COUPLING

[75] Inventor: Manfred Obermeier, Apelnstedt, Fed. Rep. of Germany

[73] Assignee: Inkoma, Cremlingen, Fed. Rep. of Germany

[21] Appl. No.: 597,756

[22] Filed: Apr. 6, 1984

[30] Foreign Application Priority Data

Apr. 9, 1983 [DE] Fed. Rep. of Germany ....... 3312825

[51] Int. Cl.$^4$ .............................................. F16D 3/48
[52] U.S. Cl. ..................... 464/138; 464/147
[58] Field of Search ................... 464/69, 71, 102, 106, 464/137, 138, 147

[56] References Cited

U.S. PATENT DOCUMENTS

| 981,736 | 1/1911 | Zock | 464/138 |
| 3,242,694 | 3/1966 | Schmidt | 464/138 X |
| 3,823,576 | 7/1974 | Colletti et al. | 464/138 X |

FOREIGN PATENT DOCUMENTS

| 224828 | 8/1910 | Fed. Rep. of Germany | 464/138 |
| 2933722 | 3/1981 | Fed. Rep. of Germany | 464/102 |
| 548992 | 7/1957 | Italy | 464/138 |
| 552781 | 12/1958 | Italy | 464/137 |
| 619714 | 8/1978 | U.S.S.R. | 464/138 |
| 703695 | 12/1979 | U.S.S.R. | 464/138 |

Primary Examiner—Stuart S. Levy
Assistant Examiner—Daniel P. Stodola
Attorney, Agent, or Firm—Schwartz, Jeffery, Schwaab, Mack, Blumenthal & Evans

[57] ABSTRACT

In a compensating coupling having flanges (1, 1', 3) connected with each other by a plurality of bolts (2), one of the flanges is connected with a rotating drive member and the other with a rotating driven member. The bolts (2) consist of a journal (8') fastened to one of the two flanges (1, 1', 3) and a sleeve (15) fastened to the other flange (1, 1', 3). The sleeve is supported on the journal by an axially vaulted surface formed on a spherical ring (20) displaceably located on the journal. A high torque may be transmitted by the coupling even when the drive shaft is tilted with respect to the driven shaft by virtue of the fact that the spherical ring is supported in an axially displaceable manner with respect to the sleeve and that at least one compression spring (13) biases the spherical ring back into its initial position.

12 Claims, 7 Drawing Figures

COMPENSATOR COUPLING

BACKGROUND OF THE INVENTION

The present invention pertains to a compensator coupling having flanges connected by means of a plurality of bolts, one of said flanges being joined to a rotating drive member and the other to a rotating driven member, wherein the bolts consist of a journal fastened to one of the two flanges and a sleeve fastened to the other flange. The sleeve is supported on the journal by means of an axially convex surface formed by a spherical shaped ring which is forced against the sleeve and is displaceable with respect to the journal.

Compensating couplings of this type have been known for a long period of time and are used to transmit rotating movements even in the case of axles which are not aligned with each other but include a slight angle between them. In practice, this occurs frequently in the case of long shafts which are sagging to some extent, so that the ends of the shafts form an angle with each other. This is found usually in instances wherein drives are coupled with each other and in the case of long roll drives which experience a certain sagging. Under these conditions a certain alignment and bending error is always obtained even with the most careful installation, and this error acts in the form of edge loads on the corresponding bearing locations, thereby leading to the premature wear of these elements. To compensate for this known error, a number of different couplings are used to transmit rotating motion while acting as compensating couplings. Attempts had been made earlier to effect the transmission of rotating motions by means of compensating couplings of the afore-described type in such a way that the bearing support between the journal and the sleeve was provided with a certain clearance through the spherical ring, thereby allowing for an oblique position of the axles with respect to each other (See U.S. Pat. No. 981,736; German Offenlegungsschrift No. 714,243 and German Pat. No. 1,909,213). In U.S. Pat. No. 981,736 this clearance is necessary, because the spherical rings are displaced in translatory fashion on the journal and are thus displaceable with respect to each other in parallel only. However, in the transition from the aligned position of the axles into an angled position, the spherical rings must move on a circular path in relation to each other. These essentially contradictory movements may be effected for small rotating angle errors only by means of a bearing clearance. In U.S. Pat. No. 981,736 the clearance is apparently provided between the journal and the spherical ring, as the sleeve tightly encloses the spherical ring.

The clearance existing between the journal and the sleeve leads to a phase shift in the transmission of the rotating motion from the drive member to the driven member. Furthermore, there is a knock in the coupling which has a particularly strong effect in reversing motion. A genuine, rotationally rigid transmission is therefore not possible with the known compensating couplings. Technically, this configuration is suitable only for low numbers of revolutions and slight angular errors. If both an angular misalignment and a large angular error are present, the rotational play within this angle would be sufficiently large to prevent the use of the solution from a technical standpoint.

More recently, flexible bolt couplings with rubber elements have been developed. They permit a certain adaptation to varying length and to potential bending angles. But rubber elements of this type prevent the transmission of high torques by the coupling. Here again, there are phase shifts between the drive member and the driven member. In addition to these relative movements, rotational vibrations may also be developed in such a system.

SUMMARY OF THE INVENTION

It is therefore an object of the present invention to provide an improved compensating coupling.

Another object of this invention is to provide a compensating coupling which makes possible rotationally rigid transmission, with no play, of large torques in the case of rotating bodies which are not aligned with each other but have an angular misalignment of up to several degrees.

In accomplishing the foregoing objects, there has been provided in accordance with the present invention a compensating coupling comprising at least two flanges, one of said flanges being connected with a rotating drive member and the other with a rotating driven member; and a plurality of bolt members connecting said flanges, wherein said bolt members comprise a journal fastened to one of the two flanges, a sleeve fastened to the other flange, an axially convex surface displaceably mounted on the journal, in an axially displaceable manner with respect to the sleeve, and at least a first compression spring biasing the spherical ring into an initial position. Preferably, the coupling includes a second compression spring projecting into the sleeve for biasing the axially displaceable ring in a direction opposite to the biasing direction of said first ring, or a second compression spring pressing against the side of the spherical ring opposite to the first compression spring. In another embodiment, the coupling includes at least one intermediate disk between the flanges wherein the bolts connect the flanges with the intermediate disk. In yet another embodiment, the coupling includes a coupling element permitting axial offsetting of the driving and driven members, connected to the flange of one of the rotating members, and wherein the coupling element is joined with the flange of the other rotating member by means of the bolts.

Further objects, features and advantages of the present invention will become apparent from the detailed description of preferred embodiments which follows, when considered together with the attached figures of drawing.

BRIEF DESCRIPTION OF THE DRAWINGS

The invention shall be explained in more detail by means of exemplary embodiments illustrated in the drawings. In the drawings.

DETAILED DESCRIPTION OF THE PREFERRED EMBODIMENTS

Figure 1:
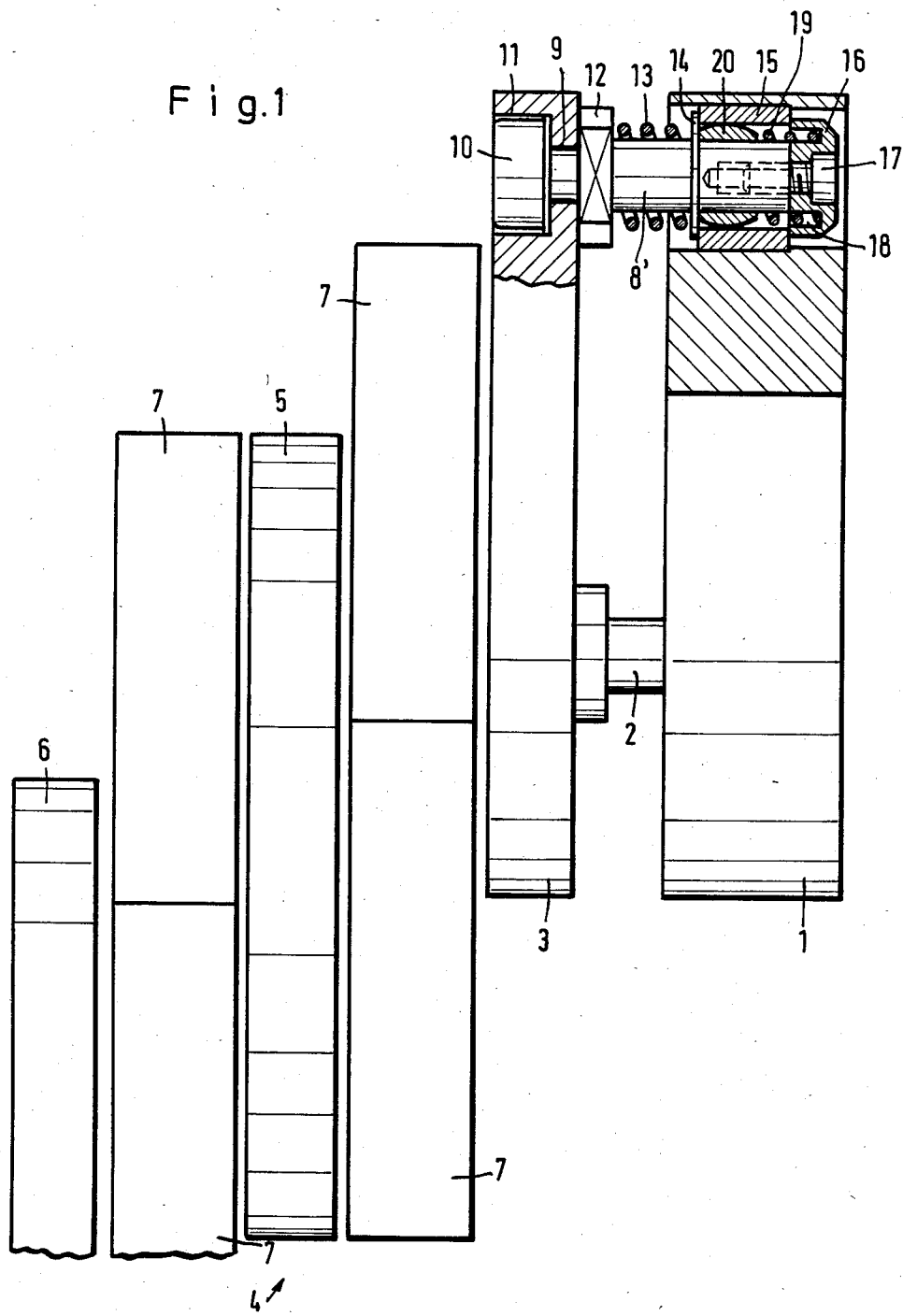
FIG. 1 is a lateral elevation view, partly in section, of a compensating coupling for axially offset drive shafts situated obliquely with respect to each other.

According to the invention, the spherical ring is supported displaceably with respect to the sleeve in the axial direction and at least one compression spring is acting to press the spherical ring back into its initial position.

The compensating coupling according to the invention, in the first instance permits the attainment of the afore-described objects with a bearing support which has no clearance or play, i.e., an embodiment displaying a genuine rotationally rigid transmission in the case of a high number of revolutions, up to 12,000 rpm, together with correspondingly high torques. The jamming of the nonaligned axles which would necessarily occur in a configuration according to U.S. Pat. No 981,736 which had no clearance, is avoided in a simple manner according to the invention by making an axial, translatory relative movement between the spherical ring and the sleeve possible. This may be effected in a simple manner by providing the sleeve with a cylindrical internal wall which is therefore not adapted to the surface of the spherical ring. The compression spring returns the spherical ring into its initial position following a deflection, so that a definite position of the spherical ring is obtained. The compression spring is preferably supported against a washer abutting against the sleeve.

Since the sleeve is longitudinally displaceable with respect to the journal, the compensating coupling according to the invention is also capable of absorbing longitudinal changes.

Preferably, a second compression spring may be provided which, while abutting against a second stop, projects into the sleeve and rests against the spherical ring under a prestress. The axial displacement of the spherical ring permits a correct guidance of the sleeve which is set obliquely with respect to the journal. The oblique position leads to a migration of both the spherical ring and the second stop in the axial direction against the first compression spring in the direction of the first stop. The spherical ring is able to perform this motion by the configuration of the coupling according to the invention.

Because in this embodiment the spherical ring rests essentially on the washer, it is advantageous to have in this configuration a much larger spring force of the first compression spring than the spring force of the second compression spring. The preponderance of the spring force of the first compression spring insures that the sleeve is returned again onto its initial position.

In an alternative embodiment which is favorable from a manufacturing standpoint, the spherical ring and the sleeve are closed off on either side with washers and held in their initial position by two springs of approximately equal force, acting against each other. This embodiment has the same dynamic properties but is simpler to produce, since compression springs of equal diameters are used. The initial position of the spherical ring here is a neutral position, wherein the spring forces cancel each other or the springs are relaxed, so that they exert no force in this position.

A favorable geometry in the oblique position of the flange may be obtained by fastening the bolts in the flange in different directions of installation. If the bolts inserted in the reverse direction are positioned diametrically with respect to each other, in both of the bolts identical oblique positions and axial displacements of the sleeves are obtained upon tilting.

In an extremely advantageous embodiment, at least one intermediate disk is arranged between the two flanges, with the flanges being connected with the intermediate disk by means of the bolts. This three disk coupling makes it possible to effect an axial offset of two parallel rotating shafts. In this embodiment only the intermediate disk is tilted, but it does not move relative to the two flanges during the rotation of the coupling. The tilting is absorbed by the configuration of the bolts. In this embodiment the coupling represents an entirely novel configuration of a compensating coupling permitting axial offsets.

It is seen that the extent of the axial offset is limited in the afore-described embodiment. For larger axial offsets it is advantageous to join the flange of rotating body with a coupling permitting an axial offset and to effect the joining of the coupling with the flange of the other rotating body by means of the bolts. The compensating coupling formed in this manner permits both a large axial offset and the compensation for an angle between the rotating bodies. This is important especially in the case of large installations, since long rotating shafts tend to sag, thereby producing an angle at the flange. This constellation has led to considerable problems in actual practice; however, these are resolved by the coupling according to the invention.

Figure 2:
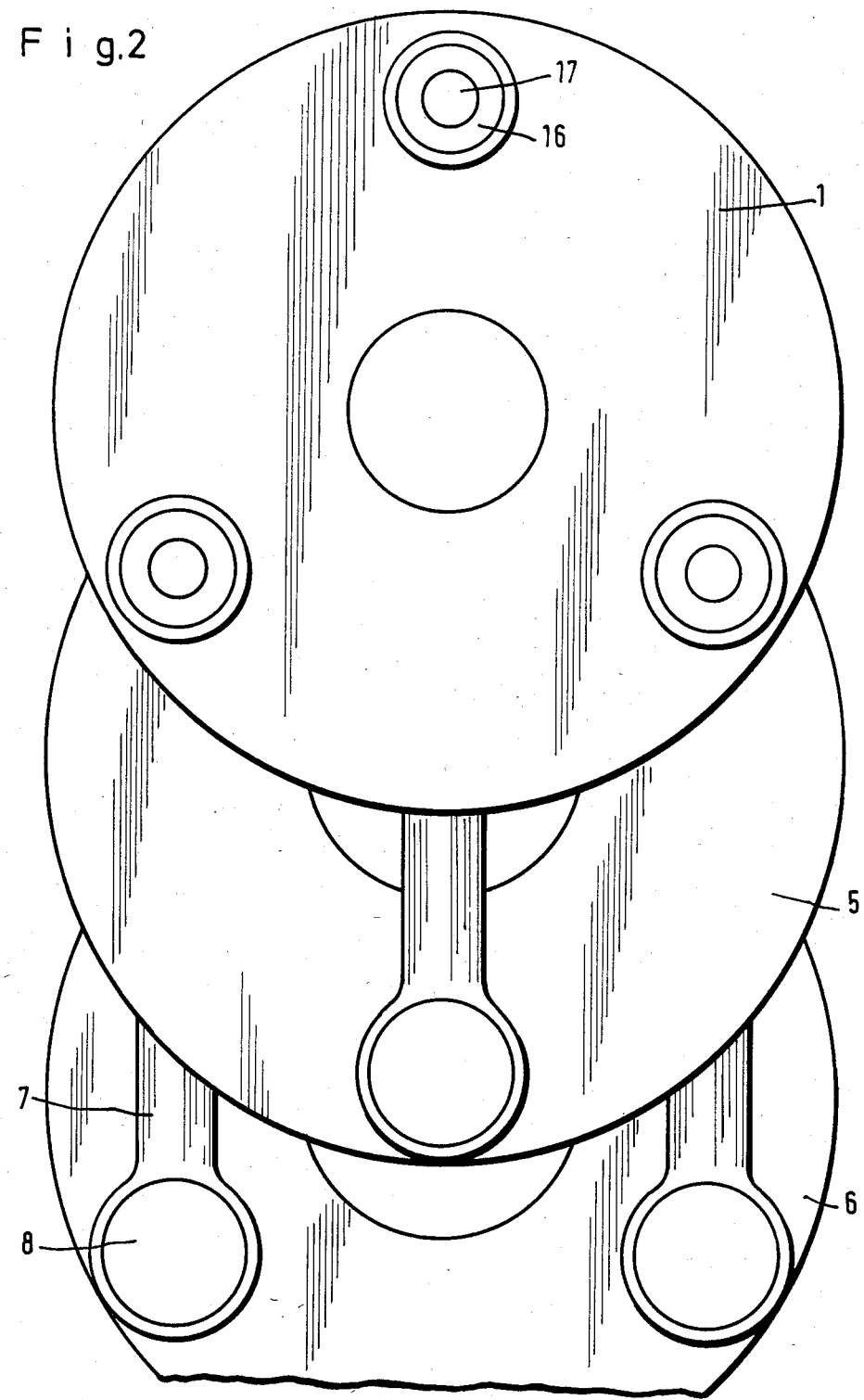
FIG. 2 is a front elevation of the embodiment of FIG. 1.

The compensating coupling shown in FIGS. 1 and 2 has a disk 1 serving as the flange for a drive shaft (not shown), said disk being connected by means of three bolts 2 with the disk 3 of conventional coupling 4. The coupling 4 consists of three disks 3, 5, 6, connected to each other respectively with three connecting rods 7. Each of the connecting rods has a swivel joint 8 at its ends, one of which is connected with one of the disks 3, 5, 6 and the other with the adjacent disk 3, 5, 6. By means of the connecting rods 7 and the intermediate disk 5, it is possible to bring the disk 6 within a certain radius in any axial position with respect to the disk 3. The coupling 4 thereby makes possible a rotation angle-true transmission of a rotary motion of a drive shaft (not shown) connected with the disk 6, to the disk 3 and the disk 1 connected with it. Within the overall arrangement, the coupling 4 serves to make possible a larger axial offset of the drive shaft to the driven shaft.

The bolt 2 consists of a journal 8' projecting with a thread through bore 9 in the disk 3 and arrestable by means of a nut 10 within an appropriately shaped recess in the disk 3. In the installed state a flange-like stop 12 rests against the disk 3, against the other side of which pressure is applied by a compression spring 13 wound around the journal 8'. The compression spring 13 abuts with its other end against a washer 14 slid onto the journal. The latter is in turn pressed by the first compression spring 13 against a sleeve 15, which rests with its other end against a second flange-like stop 16, which is fastened to the journal 8' by means of a hexagon socket screw 17. A compression spring 19 is set into a radially extending groove 18 having an internal diameter corresponding to the external diameter of the journal 8', and the set spring 19 presses a Kalotte ring (spherical shaped ring) 20 against the washer 14. The ring 20 has a surface arching in the manner of a vault in the axial direction, upon which the sleeve 15 rests. The sleeve 15 is pressfit into the disk 1. As the sleeve 15 may assume an oblique position on the vault-like arched surface of the spherical ring 20, the disk 1 may also tilt with respect to the disk 3. If the disk 6 is rotated by a drive shaft, the rotation is transmitted true to the angle of rotation to the disk 1, which is possibly tilted. The disk 1 is tilted for example by a long, slightly sagging drive shaft. This drive shaft can therefore be rotated together with the complete drive illustrated in a rotation angle true manner by means of the drive shaft connected with the disk 6. The position of the connecting rods shown in FIGS. 1 and 2 is appropriate for a maximum axial offset. By varying the position of the connecting rods, any other smaller axial offset, including a 0 offset, may be accomplished. Additionally, by means of the disk 1 coupled with the bolts (which disk may also be formed by a flange made in a single piece with a driven shaft) a tilting of the driven shaft with respect to the drive shaft is also possible.

Figure 3:
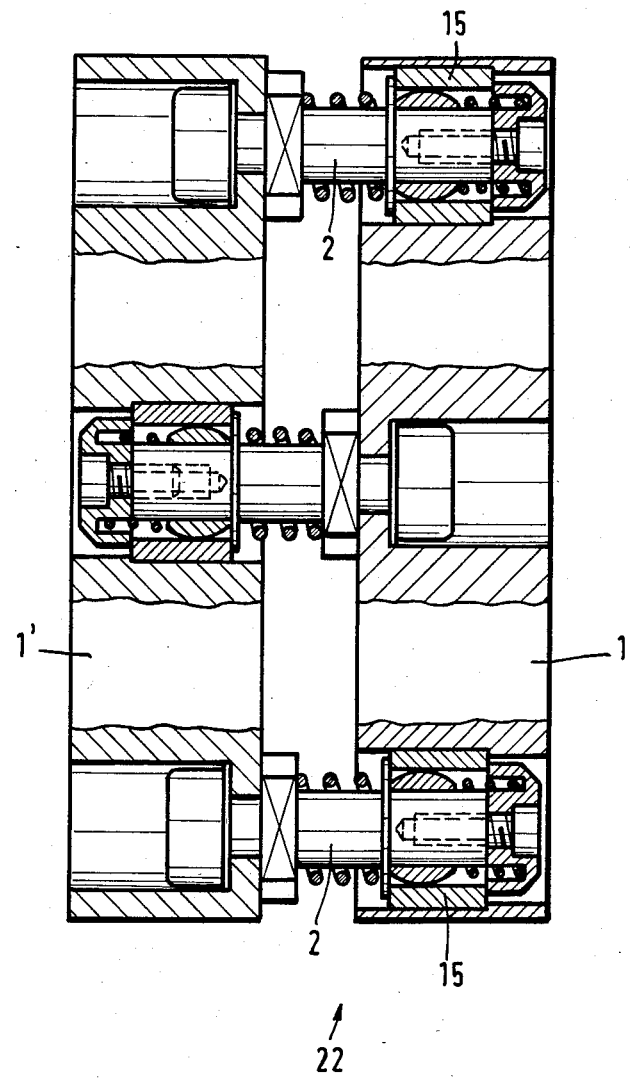
FIG. 3 is a lateral elevation, partly in section, of a two-disk coupling.
Figure 4:
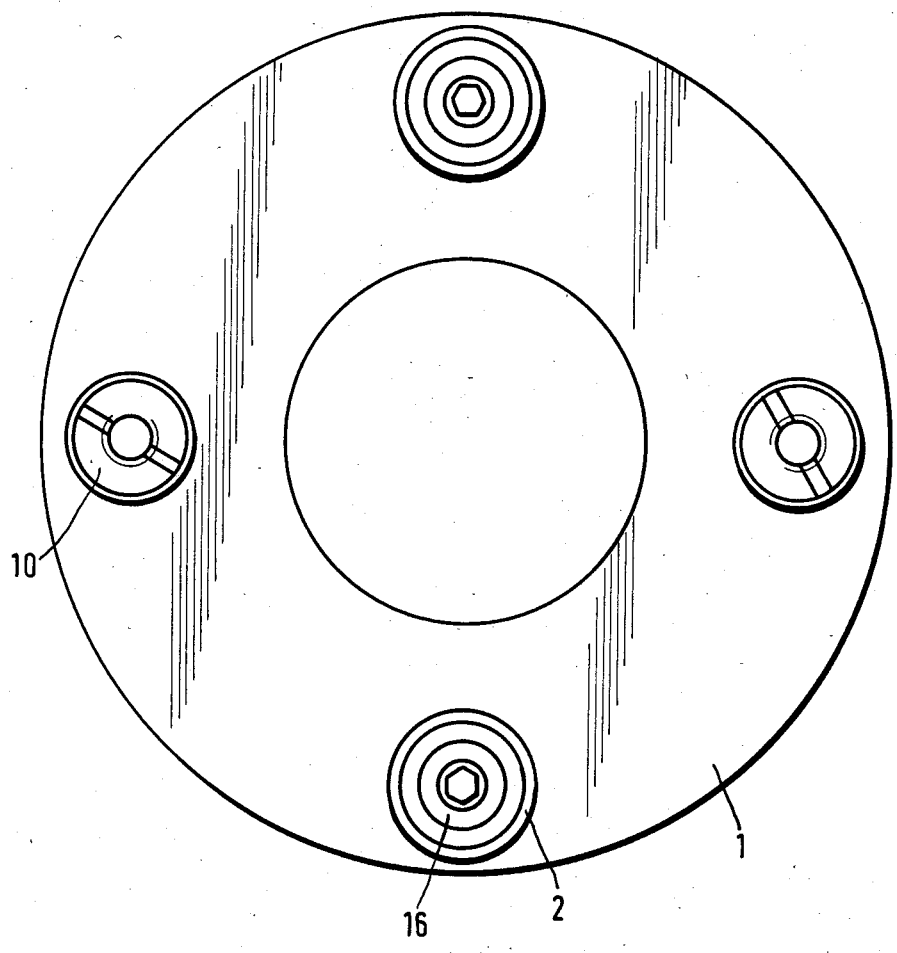
FIG. 4 is a front elevation of the coupling of FIG. 3.

In FIGS. 3 and 4, two disks 1, 1' are shown, one of which may be connected with a drive shaft and the other with a driven shaft. The two-disk coupling 21 formed by the two disks 1, 1' permits a tilting of the drive shaft with respect to the driven shaft. In the embodiment shown in FIGS. 3 and 4 four bolts are provided, of which two are always installed in the reverse direction, i.e., if the sleeve 15 is fastened to the disk 1, the corresponding sleeve 19 of the bolt 2, offset by 90°, is fastened to the disk 1'. This arrangement has the advantage that the tilting of the disks with respect to each other in both sleeves 15 leads to identical oblique positions and possible axial deflections.

Figure 5:
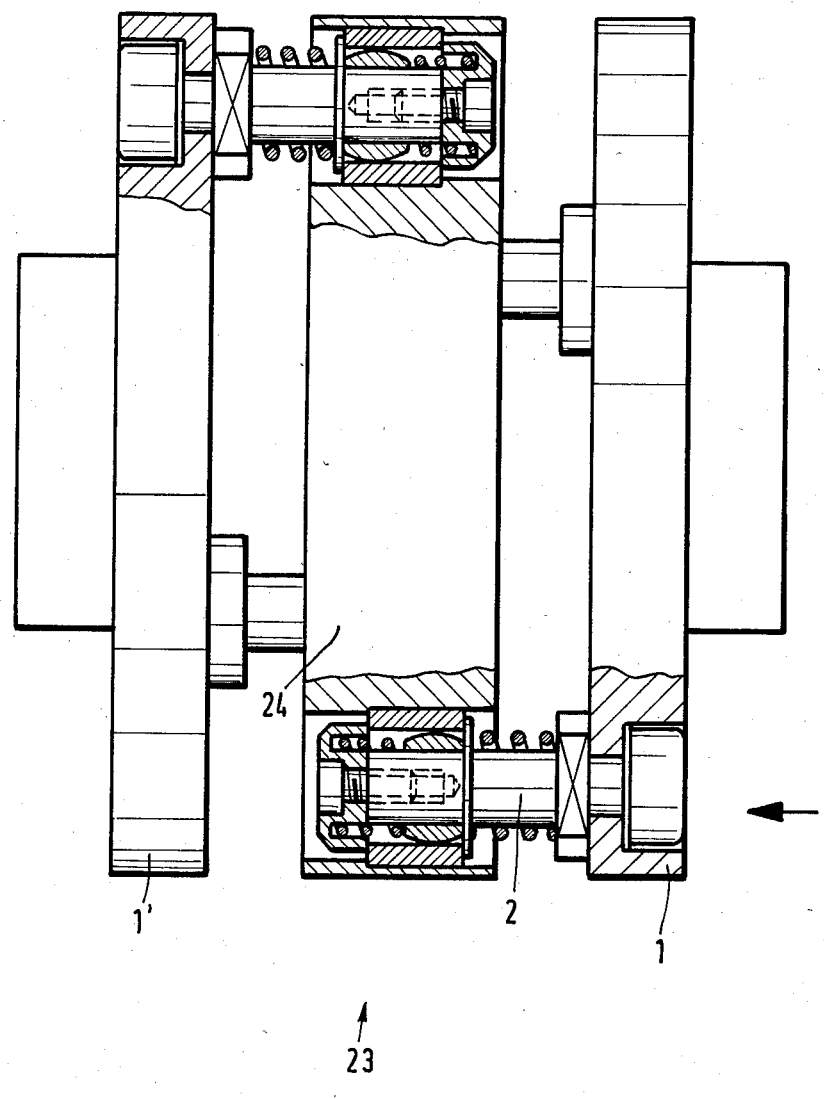
FIG. 5 is a lateral elevation, partly in section, of a three-disk coupling.
Figure 6:
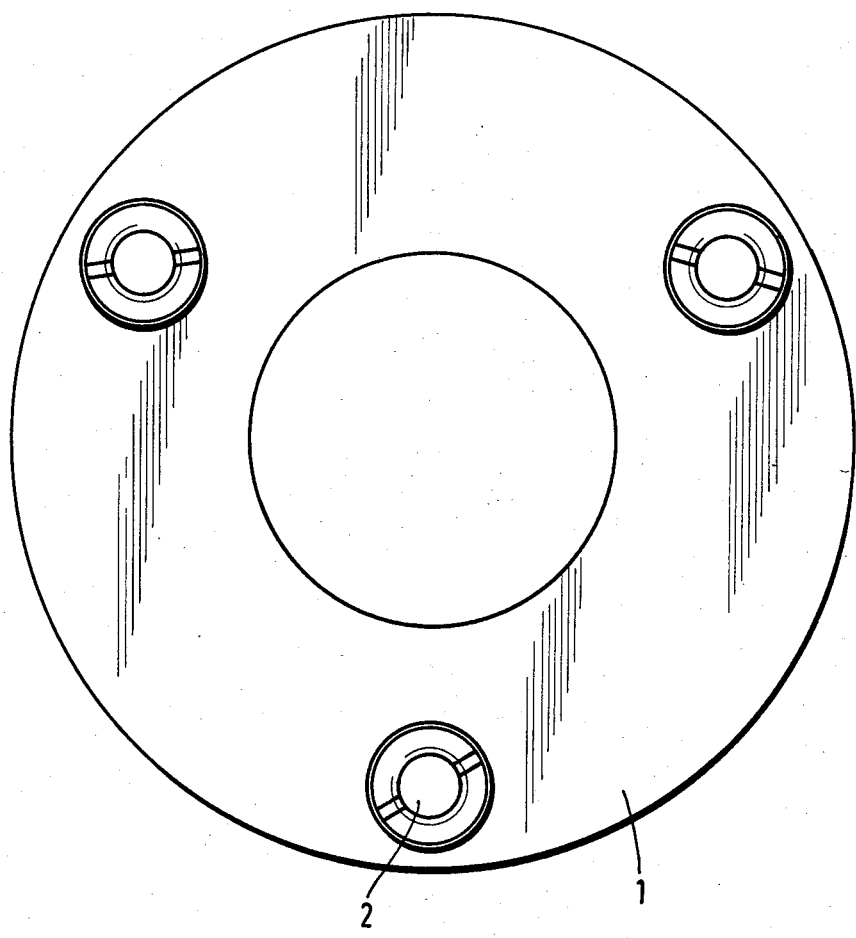
FIG. 6 is a front elevation of the coupling of FIG. 5.

The three-disk coupling 22 shown in FIGS. 5 and 6 has two disks 1, 1', which are intended to be connected with a drive and a driven shaft, respectively. The two disks are connected with each other by means of an intermediate disk 23. In each instance, three bolts 2 hold the disk 1 or 1', respectively, on the intermediate disk 23, so that in the intermediate disk 23 six bushing parts of the bolts 2 are distributed uniformly over the circumference of the intermediate disk 23. As the size of all three of the disks 1, 1' and 23 is equal, in FIG. 6 in the view in the direction of the arrow in FIG. 5 only the disk 1 with the three bolts 2 is seen.

The three-disk coupling 22 obviously also makes it possible to tilt the driven shaft with respect to the drive shaft, but beyond this permits a certain axial offset between the drive and driven shaft. For this purpose the disks 1, 1' remain in parallel positions, but the intermediate disk 23 is tilted. The oblique position is absorbed by the tilting of the sleeves 15 in the intermediate disk 23. In this manner, with the coupling according to the invention a rotary drive of axially offset shafts may also be accomplished.

Figure 7:
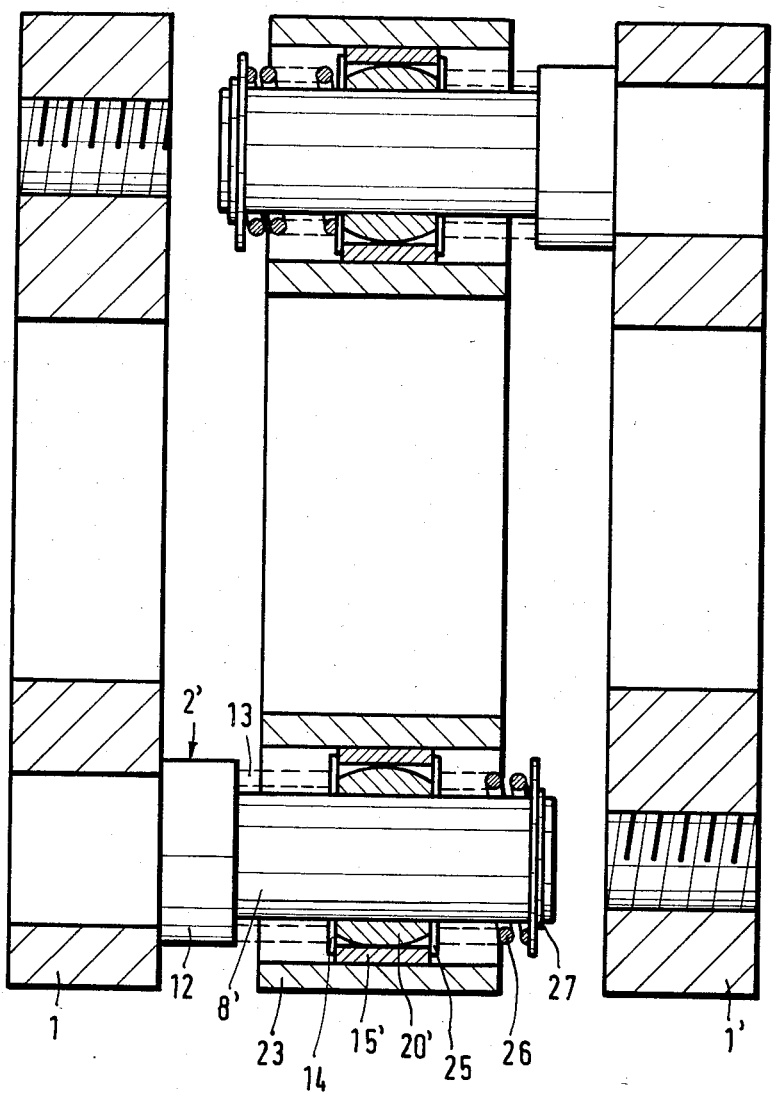
FIG. 7 is a cross-sectional view of a three-disk coupling having an alternative configuration of the bolt layout.

FIG. 7 shows an alternative embodiment of the bolt layout with reference to a three-disk coupling, which may be manufactured simpler than the bolt layout according to FIG. 1. The configuration of the bolt layout 2' corresponds essentially to the layout of the bolts 2. Identical parts, such as the journal 8', stop 12, washer 14 and compression spring 13 are therefore provided with the same reference numbers as in FIG. 1 and following. The sleeve 15' and the spherical shaped ring 20' have in this embodiment approximately the same width and are closed off toward the other side also by a washer 25. A compression spring 26 presses against the washer 25; it has approximately the same dimensions as the first compression spring 13. The other end of the compression spring 26 rests against a stop 27 set onto the journal. The initial position of the spherical ring 20' and the sleeve 15' is therefore determined by the compression springs 13, 26. Any deflection from this initial position produces a resetting force by the compressed spring 13 or 26.

The function of the bolts 2' corresponds to the essential function of the bolts 2. The essential feature consists of the fact that both the sleeve 15' and sleeve 15 have cylindrical internal walls, permitting the axial displacement of the spherical ring 20' and 20, respectively, with respect to the sleeve 15' and 15, respectively.

It may be noted that the number of bolts 2, 2' per disk 1, 3 is not restricted to three. Embodiments having two or more than three bolts are possible. An increase in the number of bolts results in the fact that a larger torque may be transmitted with the same diameter.

What is claimed is:

1. A compensating coupling comprising at least two flanges, one of said flanges being connected with a rotating drive member and the other with a rotating driven member; and a plurality of bolt members connecting said flanges, and for transmitting torque from the drive member to the driven member, wherein each of said bolt members includes a journal fastened to one of the two flanges, a sleeve having a cylindrical inner surface fastened to the other flange, a spherical ring having an axially convex surface, wherein the spherical ring is mounted on the journal for movement axially along the journal and mounted within said sleeve for movement axially along the inner surface of the sleeve, and at least a first compression spring biasing the spherical ring into an initial position.

2. A coupling according to claim 1, including a washer abutting against the sleeve and wherein the ring compression spring is supported against said washer.

3. A coupling according to claim 1, wherein the first compression spring abuts against the surface of one of said flanges.

4. A coupling according to claim 1, further comprising a second compression spring projecting into the sleeve for biasing the axially displaceable spherical ring in a direction opposite to the biasing direction of said first spring.

5. A coupling according to claim 4, wherein the spring force of the first compression spring is significantly greater than the spring force of the second compression spring.

6. A coupling according to claim 1, further comprising a second compression spring pressing against a side of the spherical ring opposite to the first compression spring.

7. A coupling according to claim 6, further comprising a second washer between the spherical ring and the second compression spring.

8. A coupling according to claim 6, wherein the second compression spring is approximately of the same strength as the first compression spring.

9. A coupling according to claim 1, wherein at least some of the bolt members are inserted in opposite directions to one another through said flanges.

10. A coupling according to claim 1, further comprising at least one intermediate disk between the flanges, wherein the bolt members connect the flanges with the intermediate disk.

11. A coupling according to claim 1, further comprising a coupling element permitting axial offsetting of the driving and driven members, connected to the flange of one of the rotating members, and wherein the coupling element is joined with the flange of the other rotating member by means of the bolt members.

12. A compensating coupling, comprising:
a first flange connected to a drive member;
a second flange connected to a driven member;
an intermediate disc disposed between the first and second flanges and having cylindrical bores;
a plurality of bolt members connecting the first flange and the intermediate disc, for transmitting torque from the drive member to the driven member, wherein each of said bolt members includes a journal fastened to one of the flanges, a sleeve having a cylindrical inner surface, said sleeve being mounted to slide axially within one of said bores, a spherical ring having an axially convex surface for pivoting in the sleeve, said spherical ring being mounted on the journal for movement axially along said journal, first and second washers on first and second sides of the sleeve for holding the sleeve and the spherical ring in a fixed relative axial position, first and second compression springs abutting the first and second washers, respectively, and for biasing the sleeve and spherical ring into an initial position.

* * * * *